United States Patent
Deng

(10) Patent No.: US 7,806,602 B2
(45) Date of Patent: Oct. 5, 2010

(54) OPTICAL MICRO-CONNECTOR

(75) Inventor: Hongyu Deng, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/049,082

(22) Filed: Mar. 14, 2008

(65) Prior Publication Data

US 2009/0232511 A1    Sep. 17, 2009

(51) Int. Cl.
*G02B 6/42* (2006.01)
(52) U.S. Cl. .................................. 385/88; 385/89
(58) Field of Classification Search .................. None
See application file for complete search history.

(56) References Cited

U.S. PATENT DOCUMENTS

| | | | | |
|---|---|---|---|---|
| 3,946,467 | A * | 3/1976 | Lukas et al. | 24/537 |
| 4,311,359 | A * | 1/1982 | Keller | 385/88 |
| 4,327,964 | A | 5/1982 | Haebly et al. | |
| 4,406,515 | A | 9/1983 | Roberts | |
| 4,427,879 | A * | 1/1984 | Becher et al. | 250/215 |
| 4,461,537 | A * | 7/1984 | Raymer et al. | 385/88 |
| 4,533,209 | A * | 8/1985 | Segerson et al. | 385/88 |
| 4,813,760 | A * | 3/1989 | Tanaka et al. | 385/62 |
| 5,007,702 | A * | 4/1991 | Segerson | 385/88 |
| 5,076,656 | A | 12/1991 | Briggs et al. | |
| 5,259,052 | A | 11/1993 | Briggs et al. | |
| 5,757,997 | A | 5/1998 | Birrell et al. | |
| 6,018,606 | A * | 1/2000 | Sogabe et al. | 385/136 |
| 6,074,102 | A * | 6/2000 | Oikawa | 385/88 |
| 6,086,263 | A * | 7/2000 | Selli et al. | 385/88 |
| 7,025,619 | B2 | 4/2006 | Tsui et al. | |
| 7,597,485 | B2 * | 10/2009 | Moriarty et al. | 385/89 |
| 2002/0012505 | A1 * | 1/2002 | Naito | 385/88 |
| 2002/0025122 | A1 * | 2/2002 | Ouchi et al. | 385/88 |
| 2004/0136659 | A1 * | 7/2004 | Castellon | 385/88 |
| 2004/0248468 | A1 | 12/2004 | Gurovich et al. | |
| 2005/0019038 | A1 * | 1/2005 | Ikeda | 398/164 |
| 2005/0067698 | A1 * | 3/2005 | Aruga et al. | 257/737 |

(Continued)

FOREIGN PATENT DOCUMENTS

JP    1-229209 A  *  9/1989

(Continued)

OTHER PUBLICATIONS

SFF-8431 Specifications for Enhanced 8.5 and 10 Gigabit Small Form Factor Pluggable Module "SFP+", Revision 2.0, Apr. 26, 2007, p. 1. Retrieved from http://www.mergeoptics.com/pdf/SFF-8431.pdf.*

(Continued)

*Primary Examiner*—Mike Stahl
(74) *Attorney, Agent, or Firm*—Wyatt, Tarrant & Combs, LLP; William S. Parks

(57) ABSTRACT

A low-cost, high-speed micro-connector replacement for current electrical inter-connects and intra-connects on printed circuit boards is provided. The invention permits fast and reliable information transmission over a single fiber through the utilization of an optical transmitter module or optical receiver module mounted in close proximity to a modulator used to encode optical signals from electrical impulses or decode optical signals to electrical impulses. The micro-connector is mounted on a PCB in alignment with the transmitting or receiving modules and provides appropriate alignment and stop positioning of an optical fiber used for optical transmitting between transmitting/receiving modules.

2 Claims, 4 Drawing Sheets

U.S. PATENT DOCUMENTS

| | | | |
|---|---|---|---|
| 2005/0117913 A1* | 6/2005 | Hung et al. | 398/139 |
| 2005/0195865 A1* | 9/2005 | Aronson | 372/9 |
| 2005/0286901 A1* | 12/2005 | Sasser et al. | 398/135 |
| 2006/0115206 A1* | 6/2006 | Supper | 385/14 |
| 2006/0153503 A1 | 7/2006 | Suzuki et al. | |
| 2006/0171631 A1* | 8/2006 | Deng et al. | 385/28 |
| 2008/0050074 A1* | 2/2008 | Dallesasse et al. | 385/92 |
| 2008/0193142 A1* | 8/2008 | Kopp et al. | 398/139 |

FOREIGN PATENT DOCUMENTS

JP  7-140359 A  *  6/1995

OTHER PUBLICATIONS

SFP+: Advantages and Challenges in designing-in SFP+. Retrieved from http://www.opnext.com/products/pdf/SFP+_AdvantagesAndChallenges.pdf on Aug. 22, 2008.*

U.S. Appl. No. 12/049,062 Office Action dated Dec. 10, 2009.

U.S. Appl. No. 12/049,062 Office Action dated Jun. 11, 2009.

U.S. Appl. No. 12/049,062 Office Action dated Feb. 5, 2009.

U.S. Appl. No. 12/049,062 Office Action dated Aug. 28, 2008.

U.S. Appl. No. 12/049,123 Office Action dated Nov. 27, 2009.

* cited by examiner

OPTICAL MICRO-CONNECTOR

FIELD OF THE INVENTION

The present invention relates to an optical connector, more particularly to a micro-connector that holds an optical fiber over a laser or detector in order to transmit information by optical means. The invention permits fast and reliable information transmission over a single fiber through the utilization of an optical transmitter module or optical receiver module mounted in close proximity to a modulator used to encode optical signals from electrical impulses or decode optical signals to electrical impulses. The micro-connector is mounted on a PCB in alignment with the transmitting or receiving modules and provides appropriate alignment and stop positioning of an optical fiber used for optical transmitting between transmitting/receiving modules.

BACKGROUND OF THE INVENTION

As future high speed computing technologies find a need to transfer large amounts of data from point to point between electronic components, technologies will have to adapt in order to satisfy this requirement. The common solution today is to carry inter-circuit and intra-circuit signals via traditional electrical conductors. As processing speeds increase, however, the skin effect of high frequency signals can create a host of problems including high resistance, large power consumption, and limited signal transmission distance.

In recent years, increased attention has been focused on optical interconnects as a means to solve the problems encountered with traditional electrical connections. While optical connections have always been known for their speed and reliability they have also been associated with a high cost of implementation. In fact, in an effort to help advance the relevant Art in the field, intense research has been underway in the field of silicon photonics which uses silicon as a substrate to generate, modulate, and transmit optical signals using low cost and easily produced components. However, until now there has been a lack of adequate small form-factor and low cost micro-connectors for utilization in optical interconnections.

ADVANTAGES AND SUMMARY OF THE INVENTION

One advantage of the present invention is it permits high speed connections through a single fiber at a very low cost and through a very reliable microdevice. Another advantage of the invention is the capability of the connector in preventing connection failure due to improper seating of an optical fiber while simultaneously exhibiting a small footprint for easy incorporation into most PCB applications.

Accordingly, the present invention encompasses a method of transferring information between first and second printed circuit boards, said method comprising the conversion of electrical impulses from a first printed circuit board to optical signals, transferring said optical signals from said first circuit board to said second circuit board over a single bare optical fiber connected to both of said printed circuit boards through microconnection devices, and converting said optical signals to electrical impulses at said second circuit board, wherein no silicon waveguides are utilized. Furthermore, encompassed as well within the invention is the same method wherein the rate of information transfer is at least 10 Gb/s over said bare fiber.

The above-described advantages are achieved by mounting an optical transmitter module or an optical receiver module directly onto a PCB (printed circuit board) with silicon circuitry near or underneath the module. The transmitting or receiving modules execute spatial optical transmission of signals converted from electrical impulses to optical signals by the silicon circuitry to which they are attached. This signals are then transmitted between the optical transmitting module and the optical receiving module via an optical fiber held in position by the current micro-connector invention.

More specifically, in one embodiment of the present invention, there is provided an optical connector for connecting electronic components co-located on the same PCB or on separate PCBs and having a first connector and second connector for transmitting and receiving information between such components. The first connector includes at least an optical transmitter that converts electric signal input to an optical signal output and transmits said data via an optical fiber to a second connector. The second connector includes at least one optical receiver module that converts optical signal input from the optical transmitter module of the first connector and outputs electrical signal output to be used by components on the PCB.

One potentially preferred embodiment of the invention can provide an optical connector in which costly silicon waveguides are not utilized. Further, high-speed and high-capacity transmitting can be achieved on PCBs by adopting optical transmission as a means of transmitting data between components.

In a second potentially preferred embodiment, there is provided an optical connector for connecting electronic components co-located on the same PCB or on separate PCBs and having a first connector and second connector for transmitting information between such components. The first connector includes at least an optical transmitter that converts electric signal input to an optical signal output and transmits data via an optical fiber to a second connector. The second connector includes at least one optical receiver module that converts optical signal input from the optical transmitter module of the first connector and outputs electrical signal output to be used by components on the PCB. The second connector may also include at least one optical transmitter to convert electrical signal input to an optical signal output and transmit the output via the same optical fiber back to the first connector which then includes at least one optical receiver module that converts optical signal input from the optical transmitter module of the second connector and outputs electrical signal output to be used by components on the PCB.

Consequently, this potentially preferred second embodiment enables bi-directional optical transmitting to be executed so as to achieve diversification of information transmitting because the optical transmitter module and optical receiver modules are disposed on both the first and second connectors.

In a third potentially preferred embodiment, there is provided an optical connector according to the prior embodiments, wherein the wavelengths of optical signals transmitted by the optical transmitter module of the first connector and the second connector are different from each other and the optical receiver module corresponding to the optical transmitter module includes a wavelength selecting filter that allows only the wavelength of the optical signal transmitted by the corresponding optical transmitter module to pass through.

Because the wavelengths of optical signals emitted from the optical transmitter modules are set different from each other and the optical receiver modules include a wavelength selecting filter, the present invention enables the optical receiver module to receive an optical signal from the corresponding optical transmitter module securely, thereby achieving stable optical transmission.

In a fourth potentially preferred embodiment, there is provided the optical connector according to any one of the prior embodiments, wherein a lens assembly fabricated from glass, plastic, or other suitable material is provided and capable of being coupled to the connector and is aligned between the optical transmitting module and an optical fiber and is used to focus and direct the signal on an optical fiber.

BRIEF DESCRIPTION OF THE DRAWINGS

To further clarify the above and other advantages and features of the present invention, a more particular description of the invention will be rendered by reference to example embodiments thereof which are illustrated in the appended drawings. These drawings depict only example embodiments of the invention and are not to be considered limiting in their scope. A brief description of each drawing is included below.

DETAILED DESCRIPTION OF THE INVENTION AND PREFERRED EMBODIMENTS

Detailed embodiments of the present invention are disclosed herein; however, as will be readily apparent to those skilled in the art, the present invention may be produced in other specific forms without departing from its spirit or essential characteristics. The present embodiments, are therefore, to be considered as illustrative and not restrictive, the scope of the invention being indicated by the claims rather than the following description, and all changes which come within the meaning and range of the equivalence of the claims are therefore intended to be embraced therein.

Figure 1:
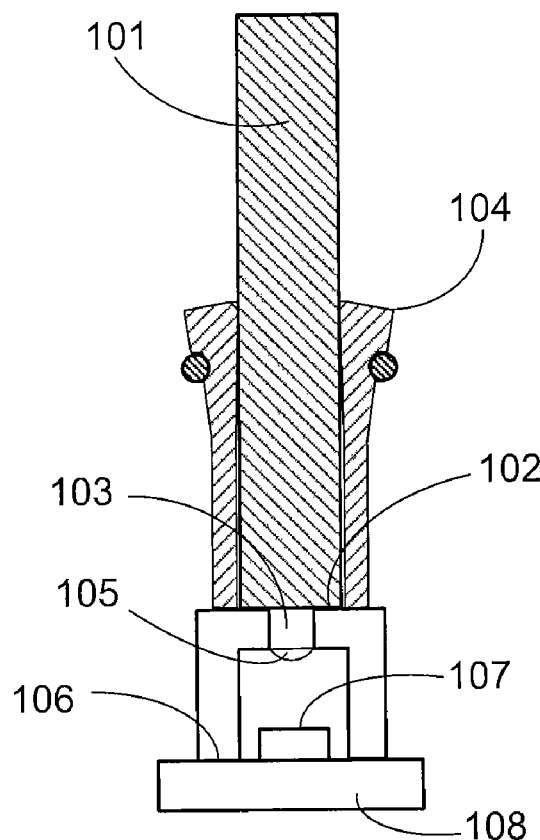
FIG. 1 is a schematic diagram showing the first connector according to the first embodiment of the present invention.

Referring to FIG. 1, a first connector includes a transmitter 107 which is used to communicate an optical signal to a optical fiber 101. The transmitter 107 can comprise a light source such as a VCSEL and a lens 105, if needed, but it will be understood to those skilled in the art, in view of the disclosure herein, that the transmitter 107 can include a wide variety of devices in any number of configurations. The transmitter 107 is located on a printed circuit board ("PCB") 108 to which it is attached 106 using solder, epoxy, or a variety of additional methods known to those skilled in the art. The light generated from a transmitter 107 then travels away from the PCB 108 and must first traverse a cap 103 used to protect the components of the transmitter 107. This cap 103 may be composed of any material; including glass, plastic, and other durable materials which allow light to traverse and which is known to those skilled in the art. The cap 103 is primarily used to shield the transmitter assembly from damage. Proximate to this cap assembly 103, the micro-connector assembly illustrated in FIG. 1 includes a detent 102 designed to position the optical fiber 101 in optimal alignment to the transmitter 107 module. The optical fiber 101 is further held in correct alignment via the use of clip structures 104 meant to prevent the optical fiber 101 from falling out of alignment with the transmitter module 107.

Figure 2:
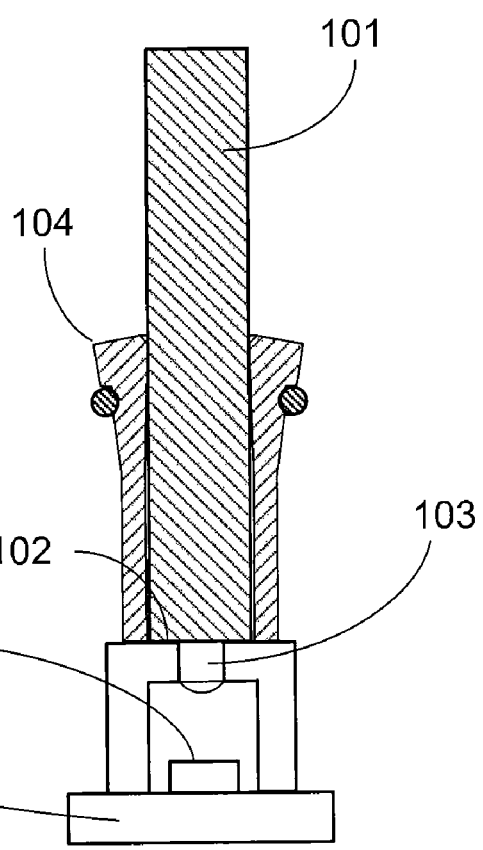
FIG. 2 is a schematic diagram showing the second connector according to the first embodiment of the present invention.
Figure 3:
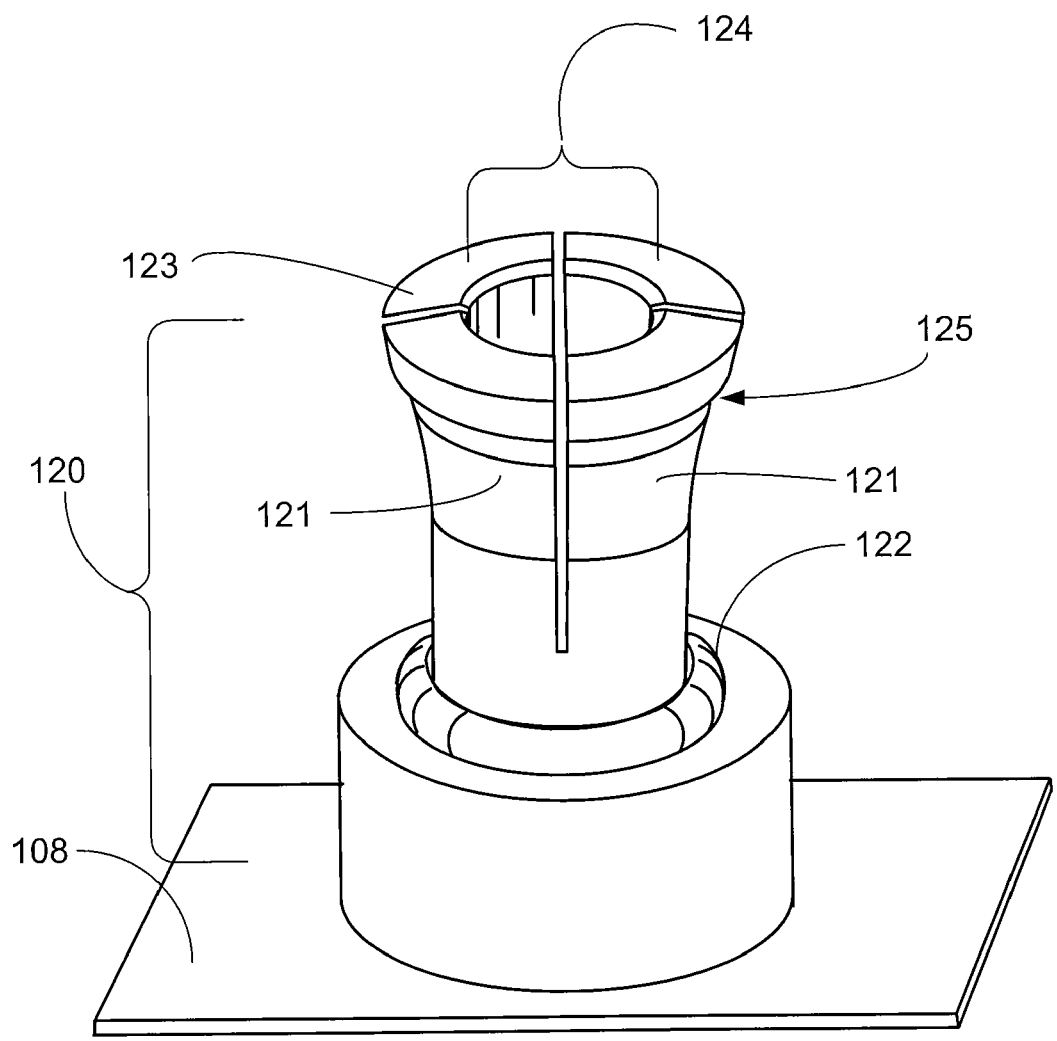
FIG. 3 is a schematic diagram showing the receiving structure according to the preferred embodiments of the present invention.

Referring to FIG. 2, a second connector is disposed proximate to a receiving PCB 110 which is to receive the signal generated by the transmitter 107 on the first connector. The optical signal generated by the transmitter 107 of the first connector is spatially transmitted to the second connector via an optical fiber 101. The optical fiber 101 is aligned on the second connector such that, similar to the first connector, clips 104 are used to help prevent the misalignment of the optical fiber 101 and the receiver module 109. There exists as well a fiber stop channel 102 in the form of the second connector such as to ensure the passive alignment of the optical fiber 101. A cap 103 is disposed between the optical fiber 101 and the receiving module 109 and is primarily used to shield the receiver assembly 109 from damage. The cap 103 may be composed of any material; including glass, plastic, or other durable material which allows light to traverse and which is known to those skilled in the art. The receiver module 109 which is used to receive an optical signal spatially transmitted via the optical fiber 101, converts the optical signal transmitted via the optical fiber 101 to electrical impulses to be carried to components on the PCB 110. It will be understood by those skilled in the art, in view of the disclosure herein, that the receiver 109 can be comprised of a wide variety of devices in any number of configurations.

Referring to FIGS. 1, 2, 3, 4, and 5, the optical fiber 101 receiving structure of both the first and second connectors is disposed distal to the PCB 108 and is comprised of a bore 120 for receiving a bare optical fiber 101. The bore 120 is formed by separate individual leg members 121 bound by a resilient retaining mechanism 122 and having a head portion integrally formed to a first proximal end 123 for insertion of the bare optical fiber 101 within the aperture 124. In order to retain the resilient retaining mechanism 122 the individual leg members 121 are formed to include some type of retaining flange 125 along the end proximate to the aperture 124 of the bore 120. The precise inner diameter of the bore 120 allows the bare optical fiber 101 to be accurately and repeatably located relative to the corresponding alignment structures such as the bore 120. The transverse end of a bare optical fiber 101 inserted into the receiving bore 120 abuts a small shoulder 102 located at the distal end of the bore 120. This small shoulder 102 acts as a stop, preventing further insertion of the bare optical fiber 101 into the bore 120.

Although four leg members 121 are illustrated, the number of leg members 121 may vary. Additionally, it is to be understood that the particular type of retaining mechanism 122 may vary so long as it functions as described herein.

Figure 4:
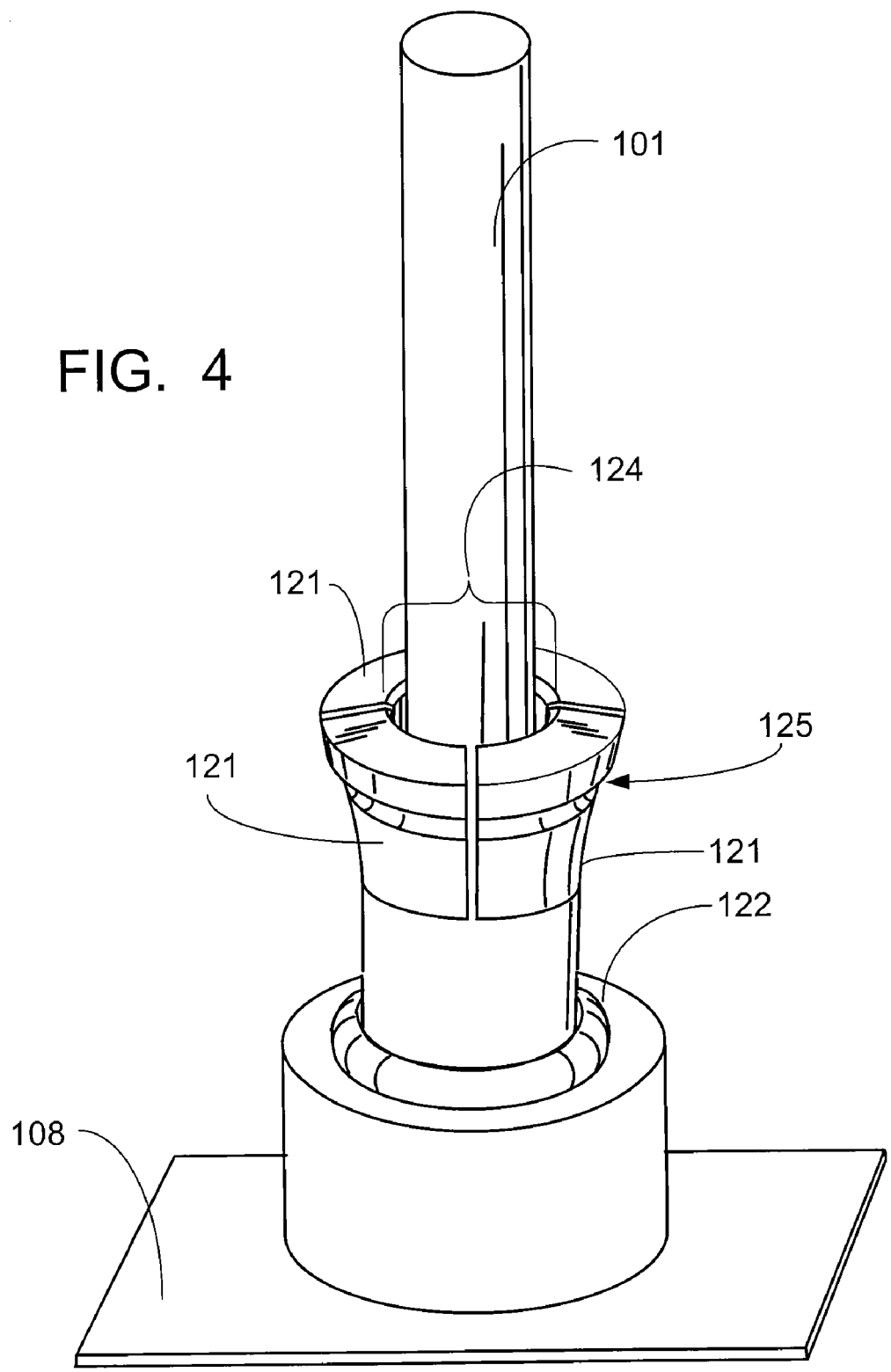
FIG. 4 is a perspective diagram showing the receiving structure upon insertion of the bare optical fiber.
Figure 5:
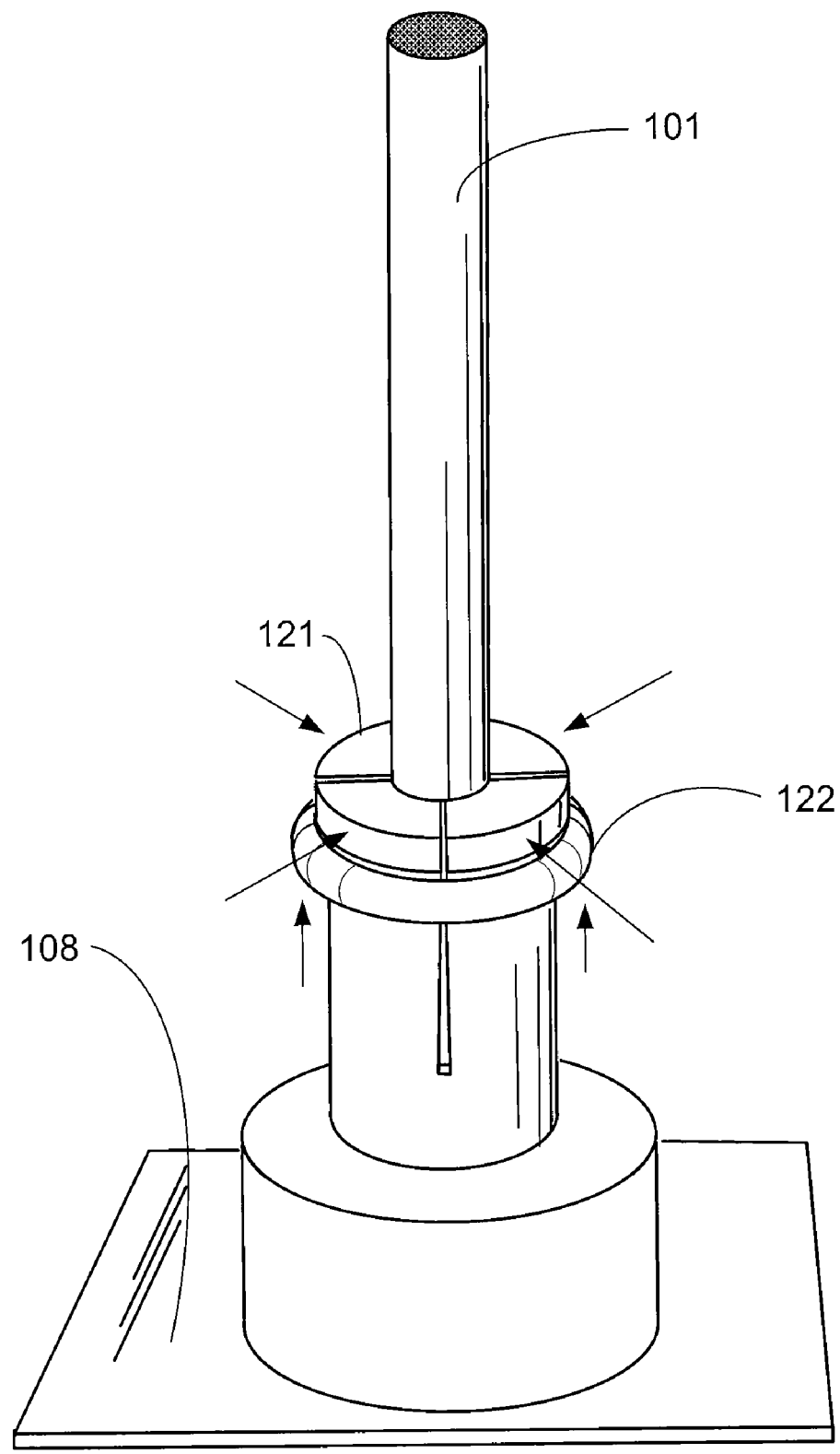
FIG. 5 is a perspective diagram showing the receiving structure upon insertion of the bare optical fiber and upon engagement of the retaining mechanism.

As FIGS. 4 and 5 illustrate, when the retaining mechanism 122 is disposed distal to the aperture 124 used for insertion of the bare optical fiber 101 (no ferrule or other cap or connector necessary at the ends), the individual leg members 121 are uncompressed and allow for insertion of the fiber 101. Upon insertion of the bare optical fiber 101, the retaining mechanism 122 moves along the individual leg members in the direction of the aperture 124 until it sits against the retaining flanges 125 located on the individual leg members 121. Upon relocation of the retaining mechanism 122 the individual leg members 121 are compressed and retain the bare optical fiber 101 in the bore 120 assembly. This compression of the individual leg members 121 shall inhibit the removal of the bare optical fiber 101 with a predetermined retention force which varies with the type of material and retaining mechanism utilized.

Information is transferable via these devices depicted in FIGS. 1 and 2 at a rate of at least 10 Gb/s and multiples of 10 Gb/s (100 Gb/s, etc.). Such rates have been unattainable without micro-connections in the past. Such configurations thus accord the industry a heretofore unknown manner of providing improvements in information transfer.

While the invention was described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalents thereto.

The invention claimed is:

1. A method of transferring information between first and second printed circuit boards, said method comprising the conversion of electrical impulses from a first printed circuit board to optical signals, transferring said optical signals from said first circuit board to said second circuit board over a single bare optical fiber having a first and second end connected to both of said printed circuit boards through micro-connection devices attached directly to each of said printed circuit boards, and converting said optical signals to electrical impulses at said second circuit board; wherein said first end of said single bare fiber is connected to said first printed circuit board through a first microconnection device and wherein said second end of said single bare fiber is connected to said second printed circuit board through a second microconnection device, wherein no silicon waveguides are utilized, wherein each of said microconnection devices includes a bore formed from a plurality of compressible leg members into which an end of said bare fiber is placed and secured upon compression of said leg members by a circular resilient retaining mechanism, and wherein each of said microconnection devices includes a cap component to which either of said first or second end of said single bare fiber is in direct contact when said microconnection device is engaged.

2. The method of claim 1 wherein the rate of information transfer is at least 10 Gb/s over said bare fiber.

* * * * *